(12) United States Patent
Armitage et al.

(10) Patent No.: US 12,066,107 B2
(45) Date of Patent: *Aug. 20, 2024

(54) SEAL STACK ASSEMBLY

(71) Applicant: SAINT-GOBAIN PERFORMANCE PLASTICS CORPORATION, Solon, OH (US)

(72) Inventors: Mark W. Armitage, Madison, CT (US); Douglas George, Trumbull, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,225

(22) Filed: Aug. 8, 2023

(65) Prior Publication Data

US 2023/0383843 A1 Nov. 30, 2023

Related U.S. Application Data

(62) Division of application No. 17/445,357, filed on Aug. 18, 2021, now Pat. No. 11,761,540.

(60) Provisional application No. 63/067,407, filed on Aug. 19, 2020.

(51) Int. Cl.
*F16J 15/32* (2016.01)
*F16J 15/3228* (2016.01)
*F16J 15/3236* (2016.01)

(52) U.S. Cl.
CPC ....... *F16J 15/3236* (2013.01); *F16J 15/3228* (2013.01)

(58) Field of Classification Search
CPC .......................... F16J 15/3236; F16J 15/3228
See application file for complete search history.

(56) References Cited

U.S. PATENT DOCUMENTS

| 1,236,116 A | 12/1880 | Tripp |
| 1,424,978 A | 4/1890 | Harris |
| 1,724,074 A | 3/1903 | Allen |
| 1,862,946 A | 8/1907 | Tucker |
| 1,180,211 A | 4/1916 | Throp et al. |

(Continued)

FOREIGN PATENT DOCUMENTS

| DE | 285159 A5 | 12/1990 |
| EP | 2570705 B1 | 4/2016 |

(Continued)

*Primary Examiner* — Vishal A Patel
(74) *Attorney, Agent, or Firm* — Abel Schillinger, LLP; Ann Palma

(57) ABSTRACT

Systems and methods include providing an annular seal stack for an assembly. The seal stack is disposed within an annulus formed between a probe and a housing of the assembly and configured to provide a radial seal between the probe and the housing. The seal stack includes a first support retainer, a first lipseal, a first seal support system comprising at least one support ring disposed between the first support retainer and the first lipseal, a second support retainer configured to support the first lipseal, a second lipseal, a second seal support system comprising at least one support ring disposed between the second support retainer and the second lipseal, and a third support retainer configured to support the second lipseal.

18 Claims, 4 Drawing Sheets

(56) References Cited

U.S. PATENT DOCUMENTS

| | | |
|---|---|---|
| 1,591,876 A | 7/1926 | Neal |
| 5,131,666 A | 7/1992 | Hutchens |
| 5,297,805 A | 3/1994 | Merkin et al. |
| 6,705,615 B2 | 3/2004 | Milberger et al. |
| 7,445,047 B2 | 11/2008 | Gomez |
| 7,828,297 B2 | 11/2010 | Hoebel et al. |
| 8,474,827 B2 | 7/2013 | Grondahl et al. |
| 9,458,691 B2 | 10/2016 | Rowe et al. |
| 9,506,588 B2* | 11/2016 | Cronin .................. F16J 15/166 |
| 10,053,946 B2* | 8/2018 | Nguyen .................. F16J 15/06 |
| 10,274,117 B2 | 4/2019 | Cronin et al. |
| 10,801,622 B2* | 10/2020 | Foster .................... F16J 15/027 |
| 2007/0089887 A1 | 4/2007 | Gomez |
| 2011/0197757 A1 | 8/2011 | Hold et al. |
| 2013/0087977 A1 | 4/2013 | Galle et al. |
| 2014/0048461 A1 | 2/2014 | Wrage et al. |
| 2014/0224496 A1 | 8/2014 | Nguyen et al. |
| 2018/0372223 A1 | 12/2018 | Yoshitsune et al. |
| 2019/0032442 A1 | 1/2019 | Kohn et al. |
| 2020/0386218 A1 | 12/2020 | Feistel |
| 2022/0056997 A1 | 2/2022 | Armitage et al. |
| 2022/0056998 A1 | 2/2022 | George |

FOREIGN PATENT DOCUMENTS

| | | |
|---|---|---|
| EP | 3504437 B1 | 8/2020 |
| JP | 2008121846 A | 5/2008 |
| JP | 2020520435 A | 7/2020 |
| WO | 2014038956 A1 | 3/2014 |
| WO | 2016126242 A1 | 8/2016 |
| WO | 2022040684 A1 | 2/2022 |
| WO | 2022040686 A1 | 2/2022 |

\* cited by examiner

SEAL STACK ASSEMBLY

CROSS-REFERENCE TO RELATED APPLICATION(S)

This application is a divisional of and claims priority under 35 U.S.C. § 120 to U.S. patent application Ser. No. 17/445,357, entitled "SEAL STACK ASSEMBLY," by Mark W. ARMITAGE et al., filed Aug. 18, 2021, which claims priority under 35. U.S.C. § 119(e) to U.S. Provisional Patent Application No. 63/067,407, entitled "SEAL STACK ASSEMBLY," by Mark W. ARMITAGE et al., filed Aug. 19, 2020, both of which are assigned to the current assignee hereof and incorporated herein by reference in their entireties.

BACKGROUND OF THE INVENTION

Seals are used in many industrial applications to prevent leakage between components of an assembly. In some applications, seals may be subjected to extreme operating conditions, such as extreme pressures or temperatures. These extreme operating conditions often necessitate the use of a seal stack assembly to compensate for articulation, deformation, displacement, and/or relative movement between assembly components. However, pressures exceeding a certain threshold may cause damage and ultimately failure of one or more seal components in the seal stack assembly. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
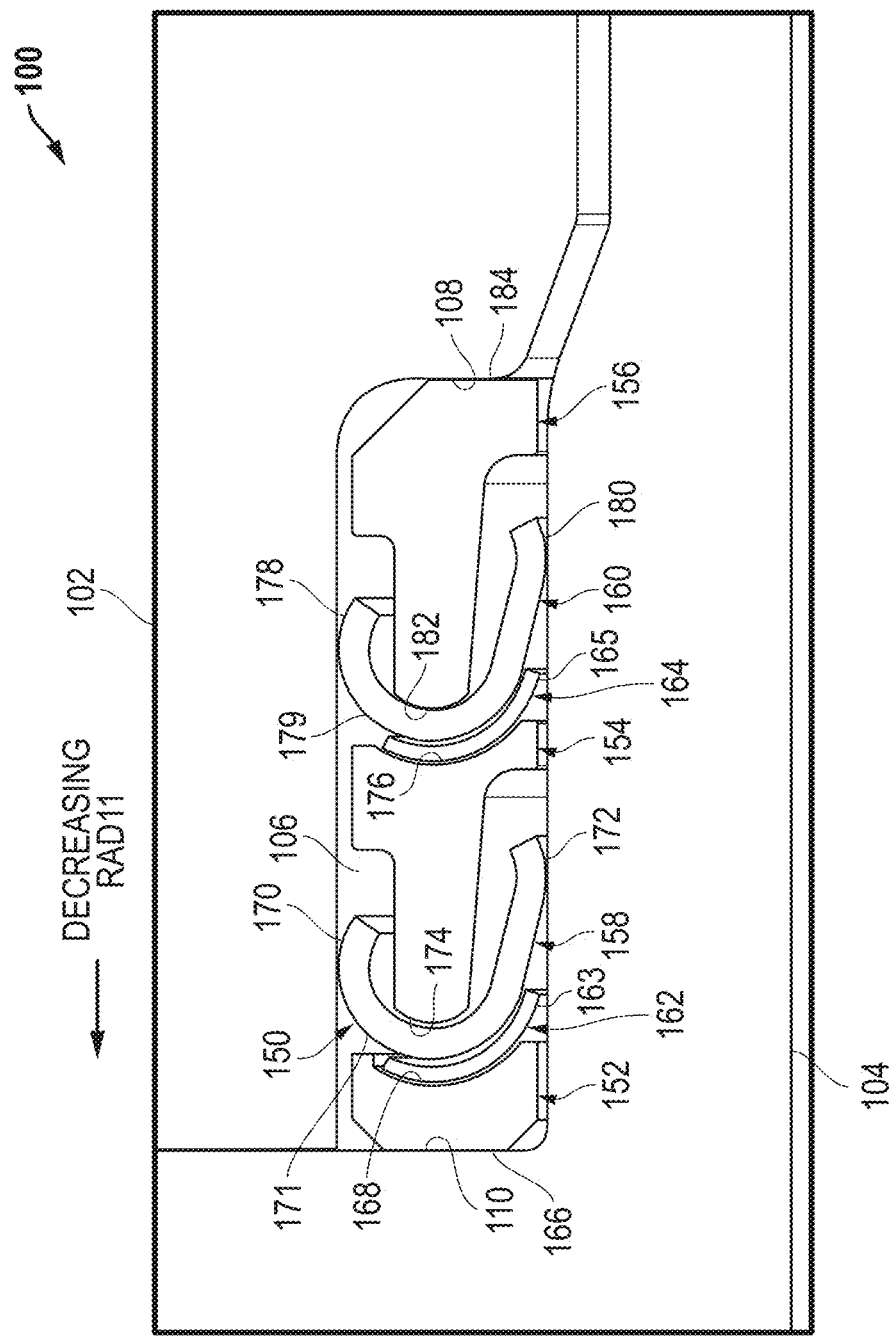
FIG. 1 is a partial cross-sectional view of an assembly having an annular seal stack assembly according to an embodiment of the disclosure.

FIG. 1 shows a partial cross-sectional view of an assembly 100 having an annular seal stack assembly 150 according to an embodiment of the disclosure. In some embodiments, the assembly 100 may be a coupling assembly, a solenoid assembly, or valve assembly. In more specific embodiments, the assembly 100 may be a subsea coupling assembly, a subsea solenoid assembly, or a subsea valve assembly. The assembly 100 may generally comprise a housing 102 and a probe 104 that oscillates, reciprocates, rotates, vibrates, or combinations thereof with respect to the housing 102. The assembly 100 may further comprise an annulus or cavity 106 formed between the housing 102 and the probe 104. In some embodiments, the housing 102 may comprise a shoulder 108, and the probe 104 may comprise a shoulder 110 that define the annulus or cavity 106.

An annular seal stack assembly 150 may generally be disposed within the annulus or cavity 106 of the assembly 100 and annularly about the probe 104. The seal stack assembly 150 may be disposed radially between the housing 102 and the probe 104. The seal stack assembly 150 may be disposed axially between the shoulders 108, 110 of the housing 102, and the probe 104. The seal stack assembly 150 may generally be configured to contact and provide a radial seal between the housing 102 and the probe 104 of the assembly 100. The seal stack assembly 150 may also be configured to center the probe 104 within the housing 102 and dynamically wipe the probe 104 during operation of the assembly 100 to keep the probe free of contaminants and/or other debris that may affect the integrity of the radial seal formed between the housing 102 and the probe 104.

The seal stack assembly 150 may generally comprise a plurality of support retainers 152, 154, 156, and a plurality of lipseals 158, 160. Additionally, the seal stack assembly 150 may comprise a plurality of seal support systems 162, 164. More specifically, the seal stack assembly 150 may comprise a first support retainer 152, a first lipseal 158, and a first seal support system 162 comprising at least one support ring 163 disposed between the first support retainer 152 and the first lipseal 158. The seal stack assembly 150 may also comprise a center or second support retainer 154, a second lipseal 160, and a second seal support system 164 comprising at least one support ring 165 disposed between the second support retainer 154 and the second lipseal 160. The seal stack assembly 150 may also comprise a third support retainer 156.

The first support retainer 152 may generally comprise a substantially flat outer portion 166 that may be in contact with the shoulder 110 of the probe 104. The first support retainer 152 may also comprise a curved surface or cavity 168. The cavity 168 may generally comprise a curved profile and be configured to at least partially receive the support ring 163 of the first seal support system 162. In some embodiments, the radius of the curved profile of the cavity 168 may be complementary to an outer radius of the support ring 163. In some embodiments, the radius of the curved profile of the cavity 168 may be smaller than the outer radius of the support ring 163, such that the support ring 163 may conform to the curvature of the curved profile of the cavity 168 when compressed.

The first lipseal 158 may generally comprise an outer sealing leg 170 configured to form a radial seal with the housing 102, an arcuate portion 171, and an inner sealing leg 172 configured to form a radial seal with the probe 104. In some embodiments, an outer radius of the arcuate portion 171 of the first lipseal 158 may be complementary to an inner radius of the support ring 163. In some embodiments, the outer radius of the arcuate portion 171 of the first lipseal 158 may be larger than the inner radius of the support ring 163, such that the support ring 163 may conform to the curvature of the first lipseal 158 when compressed. The first lipseal 158 may generally comprise a substantially J-shaped cross-sectional profile. In other embodiments, the first lipseal 158 may comprise a substantially U-shaped cross-sectional profile, a substantially D-shaped cross-sectional profile, a substantially C-shaped cross-sectional profile, a substantially parabolic-shaped cross-sectional profile, a substantially oval-shaped cross-sectional profile, or any other shaped cross-sectional profile. The first lipseal 158 may generally be formed from a resilient metallic material. More specifically, the first lipseal 158 may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the first lipseal 158 may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof.

The first seal support system 162 may generally comprise at least one support ring 163 disposed between the first support retainer 152 and the first lipseal 158. The support ring 163 may generally comprise an arced metallic ring disposed between the radius of the curved profile of the cavity 168 of the first support retainer 152 and the outer radius of the arcuate portion 171 of the first lipseal 158. In some embodiments, the support ring 163 may be configured to support the first lipseal 158 by flexing with movement of the first lipseal 158. Accordingly, in some embodiments, the support ring 163 may conform to the curvature of the curved profile of the cavity 168 of the first support retainer 152 and/or the curvature of the outer radius of the arcuate portion 171 of the first lipseal 158 when compressed. To facilitate this support, adjacent curved surfaces may have differing radii. More specifically, in some embodiments, decreasing radial geometry may extend from the first lipseal 158 to the cavity 168 of the first support retainers 152.

Accordingly, in some embodiments, the outer radius of the support ring 163 may be at least 1%, at least 2%, at least 3%, at least 4%, at least 5%, at least 10%, at least 15%, or at least 20% larger than the radius of the curved profile of the cavity 168 of the first support retainer 152. In some embodiments, the outer radius of the support ring 163 may be not greater than 50%, not greater than 40%, not greater than 35%, not greater than 30%, not greater than 25%, not greater than 20%, not greater than 15%, or not greater than 10% larger than the radius of the curved profile of the cavity 168 of the first support retainer 152. Furthermore, it will be appreciated that the outer radius of the support ring 163 may be between any of these minimum and maximum values, such as at least 1% to not greater than 50%, or at least 5% to not greater than 10% larger than the radius of the curved profile of the cavity 168 of the first support retainer 152. However, in alternative embodiments, the outer radius of the support ring 163 may be substantially similar to the radius of the curved profile of the cavity 168 of the first support retainer 152.

In some embodiments, the inner radius of the support ring 163 may be at least 1%, at least 2%, at least 3%, at least 4%, at least 5%, at least 10%, at least 15%, or at least 20% smaller than the outer radius of the first lipseal 158. In some embodiments, the inner radius of the support ring 163 may be not greater than 50%, not greater than 40%, not greater than 35%, not greater than 30%, not greater than 25%, not greater than 20%, not greater than 15%, or not greater than 10% smaller than the outer radius of the first lipseal 158. Furthermore, it will be appreciated that the inner radius of the support ring 163 may be between any of these minimum and maximum values, such as at least 1% to not greater than 50%, or at least 5% to not greater than 10% larger than smaller than the outer radius of the first lipseal 158. However, in alternative embodiments, the inner radius of the support ring 163 may be substantially similar to the outer radius of the first lipseal 158.

In some embodiments, the outer radius of the first lipseal 158 may be smaller than the radius of the curved profile of the cavity 168 of the first support retainer 152, which may allow the first lipseal 158 to expand when pressurized without restricting the first lipseal 158 from sealing on the probe 104.

The support ring 163 may generally be formed from a resilient metallic material. More specifically, the support ring 163 may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the support ring 163 may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof.

The second support retainer 154 may generally comprise an elongated finger portion 174 configured to support the first lipseal 158. In some embodiments, the elongated finger portion 174 of the second support retainer 154 may be in contact with an inner radius of the arcuate portion 171 of the first lipseal 158. The second support retainer 154 may also comprise a curved surface or cavity 176. The cavity 176 may generally comprise a curved profile and be configured to at least partially receive the support ring 165 of the second seal support system 164. In some embodiments, the radius of the curved profile of the cavity 176 may be complementary to an outer radius of the support ring 165. In some embodiments, the radius of the curved profile of the cavity 176 may be smaller than the outer radius of the support ring 165, such that the support ring 165 may conform to the curvature of the curved profile of the cavity 176 when compressed.

The second lipseal 160 may generally comprise an outer sealing leg 178 configured to form a radial seal with the housing 102, an arcuate portion 179, and an inner sealing leg 180 configured to form a radial seal with the probe 104. In some embodiments, an outer radius of the arcuate portion 179 of the second lipseal 160 may be complementary to an inner radius of the support ring 165. In some embodiments, the outer radius of the arcuate portion 179 of the second lipseal 160 may be larger than the inner radius of the support ring 165, such that the support ring 165 may conform to the curvature of the second lipseal 160 when compressed. The second lipseal 160 may generally comprise a substantially J-shaped cross-sectional profile. In other embodiments, the second lipseal 160 may comprise a substantially U-shaped cross-sectional profile, a substantially D-shaped cross-sectional profile, a substantially C-shaped cross-sectional profile, a substantially parabolic-shaped cross-sectional profile, a substantially oval-shaped cross-sectional profile, or any other shaped cross-sectional profile. The second lipseal 160 may generally be formed from a resilient metallic material. More specifically, the second lipseal 160 may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the second lipseal 160 may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof.

The second seal support system 164 may generally comprise at least one support ring 165 disposed between the second support retainer 154 and the second lipseal 160. The support ring 165 may generally comprise an arced metallic ring disposed between the radius of the curved profile of the cavity 176 of the second support retainer 154 and the outer radius of the arcuate portion 179 of the second lipseal 160. In some embodiments, the support ring 165 may be configured to support the second lipseal 160 by flexing with movement of the second lipseal 160. Accordingly, in some embodiments, the support ring 165 may conform to the curvature of the curved profile of the cavity 176 of the second support retainer 154 and/or the curvature of the outer radius of the arcuate portion 179 of the second lipseal 160 when compressed. To facilitate this support, adjacent curved surfaces may have differing radii. More specifically, decreasing radial geometry may extend from the second lipseal 160 to the cavity 176 of the second support retainer 154.

In some embodiments, the outer radius of the support ring 165 may be larger than the radius of the curved profile of the cavity 176 of the second support retainer 154. In some embodiments, the outer radius of the support ring 165 may be at least 1%, at least 2%, at least 3%, at least 4%, at least 5%, at least 10%, at least 15%, or at least 20% larger than the radius of the curved profile of the cavity 176 of the second support retainer 154. In some embodiments, the outer radius of the support ring 165 may be not greater than 50%, not greater than 40%, not greater than 35%, not greater than 30%, not greater than 25%, not greater than 20%, not greater than 15%, or not greater than 10% larger than the radius of the curved profile of the cavity 176 of the second support retainer 154. Furthermore, it will be appreciated that the outer radius of the support ring 165 may be between any of these minimum and maximum values, such as at least 1% to not greater than 50%, or at least 5% to not greater than 10% larger than the radius of the curved profile of the cavity 176 of the second support retainer 154. However, in alternative embodiments, the outer radius of the support ring 165 may be substantially similar to the radius of the curved profile of the cavity 176 of the second support retainer 154.

In some embodiments, the inner radius of the support ring 165 may be smaller than the outer radius of the second lipseal 160. In some embodiments, the inner radius of the support ring 163 may be at least 1%, at least 2%, at least 3%, at least 4%, at least 5%, at least 10%, at least 15%, or at least 20% smaller than the outer radius of the second lipseal 160. In some embodiments, the inner radius of the support ring 165 may be not greater than 50%, not greater than 40%, not greater than 35%, not greater than 30%, not greater than 25%, not greater than 20%, not greater than 15%, or not greater than 10% smaller than the outer radius of the second lipseal 160. Furthermore, it will be appreciated that the inner radius of the support ring 165 may be between any of these minimum and maximum values, such as at least 1% to not greater than 50%, or at least 5% to not greater than 10% larger than smaller than the outer radius of the second lipseal 160. However, in alternative embodiments, the inner radius of the support ring 165 may be substantially similar to the outer radius of the second lipseal 160.

In some embodiments, the outer radius of the second lipseal 160 may be smaller than the radius of the curved profile of the cavity 176 of the second support retainer 154, which may allow the second lipseal 160 to expand when pressurized without restricting the second lipseal 160 from sealing on the probe 104.

The third support retainer 156 may generally comprise an elongated finger portion 182 configured to support the second lipseal 160. In some embodiments, the elongated finger portion 182 of the third support retainer 156 may be in contact with an inner radius of the arcuate portion 179 of the second lipseal 160. The third support retainer 156 may also comprise a substantially flat outer portion 184 that may be in contact with the shoulder 108 of the housing 102. As such, it will be appreciated that the seal stack assembly 150 may be disposed radially between the housing 102 and the probe 104, and disposed axially between the shoulder 108 of the housing 102 and the shoulder 110 of the probe 104.

Figure 2:
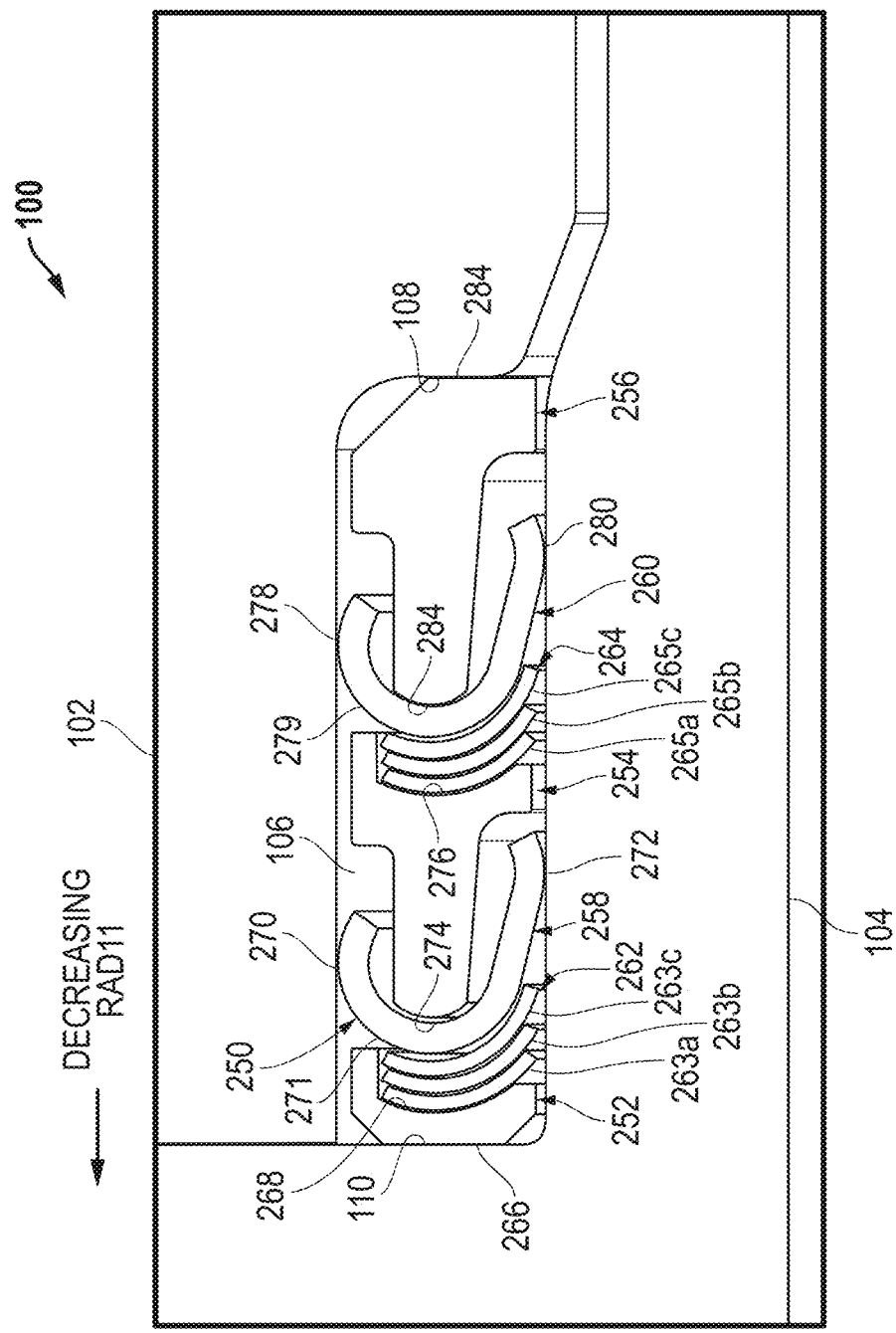
FIG. 2 is a partial cross-sectional view of an assembly having an annular seal stack assembly according to an embodiment of the disclosure.

FIG. 2 is a partial cross-sectional view of an assembly 100 having a seal stack assembly 250 according to another embodiment of the disclosure. The seal stack assembly 250 may generally comprise a plurality of support retainers 252, 254, 256, and a plurality of lipseals 258, 260. Additionally, the seal stack assembly 250 may comprise a plurality of seal support systems 262, 264. More specifically, the seal stack assembly 250 may comprise a first support retainer 252, a first lipseal 258, and a first seal support system 262 comprising a plurality of support rings 263a, 263b, 263c disposed between the first support retainer 252 and the first lipseal 258. The seal stack assembly 250 may also comprise a center or second support retainer 254, a second lipseal 260, and a second seal support system 264 comprising a plurality of support rings 265a, 265b, 265c disposed between the second support retainer 254 and the second lipseal 260. The seal stack assembly 250 may also comprise a third support retainer 256.

The first support retainer 252 may generally comprise a substantially flat outer portion 266 that may be in contact with the shoulder 110 of the probe 104. The first support retainer 252 may also comprise a curved surface or cavity 268. The cavity 268 may generally comprise a curved profile and be configured to at least partially receive one or more of the plurality of support rings 263a, 263b, 263c.

The first lipseal 258 may generally comprise an outer sealing leg 270 configured to form a radial seal with the housing 102, an arcuate portion 271, and an inner sealing leg 272 configured to form a radial seal with the probe 104. The first lipseal 158 may generally comprise a substantially J-shaped cross-sectional profile. In other embodiments, the first lipseal 258 may comprise a substantially U-shaped cross-sectional profile, a substantially D-shaped cross-sectional profile, a substantially C-shaped cross-sectional profile, a substantially parabolic-shaped cross-sectional profile, a substantially oval-shaped cross-sectional profile, or any other shaped cross-sectional profile. The first lipseal 258 may generally be formed from a resilient metallic material. More specifically, the first lipseal 258 may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the first lipseal 258 may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof.

The first seal support system 262 may generally comprise a plurality of support rings 263a, 263b, 263c disposed between the first support retainer 252 and the first lipseal 258. The support rings 263a, 263b, 263c may generally comprise arced metallic rings disposed between the radius of the curved profile of the cavity 268 of the first support retainer 252 and the outer radius of the arcuate portion 271 of the first lipseal 258. In some embodiments, the support rings 263a, 263b, 263c may be configured to support the first lipseal 258 by flexing with movement of the first lipseal 258. Accordingly, in some embodiments, the support rings 263a, 263b, 263c may conform to the curvature of the curved profile of the cavity 268 of the first support retainer 252, the curvature of adjacent support rings 263, and/or the curvature of the outer radius of the arcuate portion 271 of the first lipseal 258 when compressed. To facilitate this support, adjacent curved surfaces may have differing radii. More specifically, decreasing radial geometry may extend from the first lipseal 258 to the cavity 268 of the first support retainers 252.

In some embodiments, the outer radius of the first support ring 263a may be larger than the radius of the curved profile of the cavity 268 of the first support retainer 252. In some embodiments, the outer radius of the first support ring 263a may be at least 1%, at least 2%, at least 3%, at least 4%, at least 5%, at least 10%, at least 15%, or at least 20% larger than the radius of the curved profile of the cavity 268 of the first support retainer 252. In some embodiments, the outer radius of the first support ring 263a may be not greater than 50%, not greater than 40%, not greater than 35%, not greater than 30%, not greater than 25%, not greater than 20%, not greater than 15%, or not greater than 10% larger than the radius of the curved profile of the cavity 268 of the first support retainer 252. Furthermore, it will be appreciated that the outer radius of the first support ring 263a may be between any of these minimum and maximum values, such as at least 1% to not greater than 50%, or at least 5% to not greater than 10% larger than the radius of the curved profile of the cavity 268 of the first support retainer 252. However, in alternative embodiments, the outer radius of the first support ring 263a may be substantially similar to the radius of the curved profile of the cavity 268 of the first support retainer 252.

In some embodiments, the inner radius of the first support ring 263a may be smaller than the outer radius of the second support ring 263b. In some embodiments, the inner radius of the first support ring 263a may be at least 1%, at least 2%, at least 3%, at least 4%, at least 5%, at least 10%, at least 15%, or at least 20% smaller than the outer radius of the second support ring 263b. In some embodiments, the inner radius of the first support ring 263a may be not greater than 50%, not greater than 40%, not greater than 35%, not greater than 30%, not greater than 25%, not greater than 20%, not greater than 15%, or not greater than 10% smaller than the outer radius of the second support ring 263b. Furthermore, it will be appreciated that the inner radius of the first support ring 263a may be between any of these minimum and maximum values, such as at least 1% to not greater than 50%, or at least 5% to not greater than 10% smaller than the outer radius of the second support ring 263b.

In some embodiments, the inner radius of the second support ring 263b may be smaller than the outer radius of the third support ring 263c. In some embodiments, the inner radius of the second support ring 263b may be at least 1%, at least 2%, at least 3%, at least 4%, at least 5%, at least 10%, at least 15%, or at least 20% smaller than the outer radius of the third support ring 263c. In some embodiments, the inner radius of the second support ring 263b may be not greater than 50%, not greater than 40%, not greater than 35%, not greater than 30%, not greater than 25%, not greater than 20%, not greater than 15%, or not greater than 10% smaller than the outer radius of the third support ring 263c. Furthermore, it will be appreciated that the inner radius of the second support ring 263b may be between any of these minimum and maximum values, such as at least 1% to not greater than 50%, or at least 5% to not greater than 10% smaller than the outer radius of the third support ring 263c.

In some embodiments, the inner radius of the third support ring 263c may be smaller than the outer radius of the first lipseal 258. In some embodiments, the inner radius of the third support ring 263c may be at least 1%, at least 2%, at least 3%, at least 4%, at least 5%, at least 10%, at least 15%, or at least 20% smaller than the outer radius of the first lipseal 258. In some embodiments, the inner radius of the third support ring 263c may be not greater than 50%, not greater than 40%, not greater than 35%, not greater than 30%, not greater than 25%, not greater than 20%, not greater than 15%, or not greater than 10% smaller than the outer radius of the first lipseal 258. Furthermore, it will be appreciated that the inner radius of the third support ring 263c may be between any of these minimum and maximum values, such as at least 1% to not greater than 50%, or at least 5% to not greater than 10% larger than smaller than the outer radius of the first lipseal 258. However, in alternative embodiments, the inner radius of the third support ring 263c may be substantially similar to the outer radius of the first lipseal 258.

In some embodiments, the outer radius of the first lipseal 258 may be smaller than the radius of the curved profile of the cavity 268 of the first support retainer 252, which may allow the first lipseal 258 to expand when pressurized without restricting the first lipseal 258 from sealing on the probe 104.

The support rings 263a, 263b, 263c may generally be formed from a resilient metallic material. More specifically, the support rings 263a, 263b, 263c may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the support rings 263a, 263b, 263c may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof. However, in a particular embodiment, the second support ring 263b may be formed from a polymeric material, such as PEEK.

The second support retainer 254 may generally comprise an elongated finger portion 274 configured to support the first lipseal 258. In some embodiments, the elongated finger portion 274 of the second support retainer 254 may be in contact with an inner radius of the arcuate portion 271 of the first lipseal 258. The second support retainer 254 may also comprise a curved surface or cavity 276. The cavity 276 may generally comprise a curved profile and be configured to at least partially receive a curved profile and be configured to at least partially receive one or more of the plurality of support rings 265a, 265b, 265c. In some embodiments, the radius of the curved profile of the cavity 276 may be complementary to an outer radius of the second support ring 265. In some embodiments, the radius of the curved profile of the cavity 276 may be smaller than the outer radius of the second support ring 265, such that the second support ring 265 may conform to the curvature of the curved profile of the cavity 276 when compressed.

The second lipseal 260 may generally comprise an outer sealing leg 278 configured to form a radial seal with the housing 102, an arcuate portion 279, and an inner sealing leg 280 configured to form a radial seal with the probe 104. The second lipseal 260 may generally comprise a substantially J-shaped cross-sectional profile. In other embodiments, the second lipseal 260 may comprise a substantially U-shaped cross-sectional profile, a substantially D-shaped cross-sectional profile, a substantially C-shaped cross-sectional profile, a substantially parabolic-shaped cross-sectional profile, a substantially oval-shaped cross-sectional profile, or any other shaped cross-sectional profile. The second lipseal 260 may generally be formed from a resilient metallic material. More specifically, the second lipseal 260 may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the second lipseal 260 may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof.

The second seal support system 264 may generally comprise a plurality of support rings 265a, 265b, 265c disposed between the second support retainer 254 and the second lipseal 260. The support rings 265a, 265b, 265c may generally comprise arced metallic rings disposed between the radius of the curved profile of the cavity 276 of the second support retainer 254 and the outer radius of the arcuate portion 279 of the second lipseal 260. In some embodiments, the support rings 265a, 265b, 265c may be configured to support the second lipseal 260 by flexing with movement of the second lipseal 260. Accordingly, in some embodiments, the support rings 265a, 265b, 265c may conform to the curvature of the curved profile of the cavity 276 of the second support retainer 254, the curvature of adjacent support rings 265, and/or the curvature of the outer radius of the arcuate portion 279 of the second lipseal 260 when compressed. To facilitate this support, adjacent curved surfaces may have differing radii. More specifically, decreasing radial geometry may extend from the second lipseal 260 to the cavity 276 of the second support retainer 254.

In some embodiments, the outer radius of the first support ring 265a may be larger than the radius of the curved profile of the cavity 276 of the second support retainer 254. In some embodiments, the outer radius of the first support ring 265a may be at least 1%, at least 2%, at least 3%, at least 4%, at least 5%, at least 10%, at least 15%, or at least 20% larger than the radius of the curved profile of the cavity 276 of the second support retainer 254. In some embodiments, the outer radius of the first support ring 265a may be not greater than 50%, not greater than 40%, not greater than 35%, not greater than 30%, not greater than 25%, not greater than 20%, not greater than 15%, or not greater than 10% larger than the radius of the curved profile of the cavity 276 of the second support retainer 254. Furthermore, it will be appreciated that the outer radius of the first support ring 265a may be between any of these minimum and maximum values, such as at least 1% to not greater than 50%, or at least 5% to not greater than 10% larger than the radius of the curved profile of the cavity 276 of the second support retainer 254. However, in alternative embodiments, the outer radius of the first support ring 265a may be substantially similar to the radius of the curved profile of the cavity 276 of the second support retainer 254.

In some embodiments, the inner radius of the first support ring 265a may be smaller than the outer radius of the second support ring 265b. In some embodiments, the inner radius of the first support ring 265a may be at least 1%, at least 2%, at least 3%, at least 4%, at least 5%, at least 10%, at least 15%, or at least 20% smaller than the outer radius of the second support ring 265b. In some embodiments, the inner radius of the first support ring 265a may be not greater than 50%, not greater than 40%, not greater than 35%, not greater than 30%, not greater than 25%, not greater than 20%, not greater than 15%, or not greater than 10% smaller than the outer radius of the second support ring 265b. Furthermore, it will be appreciated that the inner radius of the first support ring 265a may be between any of these minimum and maximum values, such as at least 1% to not greater than 50%, or at least 5% to not greater than 10% smaller than the outer radius of the second support ring 265b.

In some embodiments, the inner radius of the second support ring 265b may be smaller than the outer radius of the third support ring 265c. In some embodiments, the inner radius of the second support ring 265b may be at least 1%, at least 2%, at least 3%, at least 4%, at least 5%, at least 10%, at least 15%, or at least 20% smaller than the outer radius of the third support ring 265c. In some embodiments, the inner radius of the second support ring 265b may be not greater than 50%, not greater than 40%, not greater than 35%, not greater than 30%, not greater than 25%, not greater than 20%, not greater than 15%, or not greater than 10% smaller than the outer radius of the third support ring 265c. Furthermore, it will be appreciated that the inner radius of the second support ring 265b may be between any of these minimum and maximum values, such as at least 1% to not greater than 50%, or at least 5% to not greater than 10% smaller than the outer radius of the third support ring 265c.

In some embodiments, the inner radius of the third support ring 265c may be smaller than the outer radius of the second lipseal 260. In some embodiments, the inner radius of the third support ring 265c may be at least 1%, at least 2%, at least 3%, at least 4%, at least 5%, at least 10%, at least 15%, or at least 20% smaller than the outer radius of the second lipseal 260. In some embodiments, the inner radius of the third support ring 265c may be not greater than 50%, not greater than 40%, not greater than 35%, not greater than 30%, not greater than 25%, not greater than 20%, not greater than 15%, or not greater than 10% smaller than the outer radius of the second lipseal 260. Furthermore, it will be appreciated that the inner radius of the third support ring 265c may be between any of these minimum and maximum values, such as at least 1% to not greater than 50%, or at least 5% to not greater than 10% larger than smaller than the outer radius of the second lipseal 260. However, in alternative embodiments, the inner radius of the third support ring 265c may be substantially similar to the outer radius of the second lipseal 260.

In some embodiments, the outer radius of the second lipseal 260 may be smaller than the radius of the curved profile of the cavity 276 of the second support retainer 254, which may allow the second lipseal 260 to expand when pressurized without restricting the second lipseal 260 from sealing on the probe 104.

The support rings 265a, 265b, 265c may generally be formed from a resilient metallic material. More specifically, the support rings 265a, 265b, 265c may be formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze. In some embodiments, the support rings 265a, 265b, 265c may comprise a coating or plating, such as a gold plating, a silver plating, a nickel plating, an aluminum chromium nitride (AlCrN) plating, a titanium aluminum nitride (TiAlN) plating, any other wear resistant metallic plating, or any combination thereof. However, in a particular embodiment, the second support ring 265b may be formed from a polymeric material, such as PEEK.

While three support rings 263a, 263b, 263c are shown for the first seal support system 262, and three support rings 265a, 265b, 265c are shown for the second seal support system 264, it will be appreciated that each seal support system 262, 264 may comprise two, three, four, or even 5 support rings 263, 265, respectively. Further, it will be appreciated that consecutive support rings 263, 265 may have decreasing radial geometry extending from the lipseals 258, 260 to the support retainers 252, 254, respectively, in accordance with embodiments disclosed herein. Furthermore, in some embodiments, a seal stack assembly 150, 250, may comprise additional support retainers, lipseals, and/or support rings depending on the configuration of the assembly and without departing from the spirit of this disclosure.

The third support retainer 256 may generally comprise an elongated finger portion 282 configured to support the second lipseal 260. In some embodiments, the elongated finger portion 282 of the third support retainer 256 may be in contact with an inner radius of the arcuate portion 279 of the second lipseal 260. The third support retainer 256 may also comprise a substantially flat outer portion 284 that may be in contact with the shoulder 108 of the housing 102. As such, it will be appreciated that the seal stack assembly 250 may be disposed radially between the housing 102 and the probe 104, and disposed axially between the shoulder 108 of the housing 102 and the shoulder 110 of the probe 104.

Embodiments of the seal stack assemblies 150, 250 may comprise any dimensions suitable for a particular application. In some embodiments, the inner diameter of the seal stack assembly 150, 250 may be at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater. In some embodiments, the outer diameter of the seal stack assembly 150, 250 may be at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Furthermore, in some embodiments, the support rings 163, 165, 263, 265 may comprise a thickness less than a thickness of one or more of the lipseals 158, 160, 258, 260. In some embodiments, the thickness of the support rings 163, 165, 263, 265 may be at least 0.10 millimeter, at least 0.125 mm, at least 0.15 mm, at least 0.20 mm, at least 0.25 mm, at least 0.50 mm, at least 0.75 mm, at least 1 mm, at least 2 mm, at least 5 mm, or even greater.

Figure 3A:
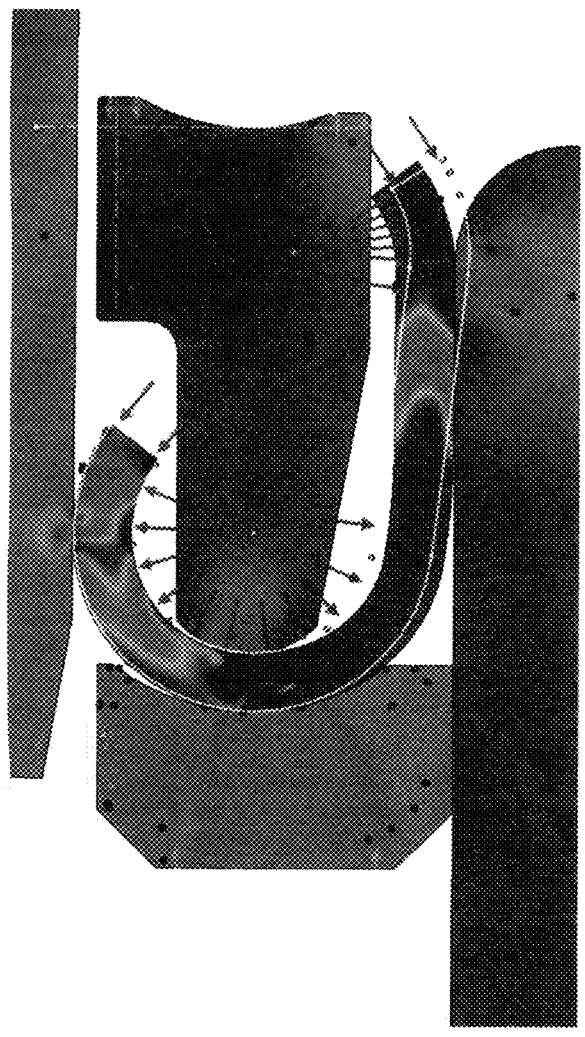
FIG. 3A is a partial cross-sectional view showing the stress distribution on a lipseal of a traditional annular seal stack.
Figure 3B:
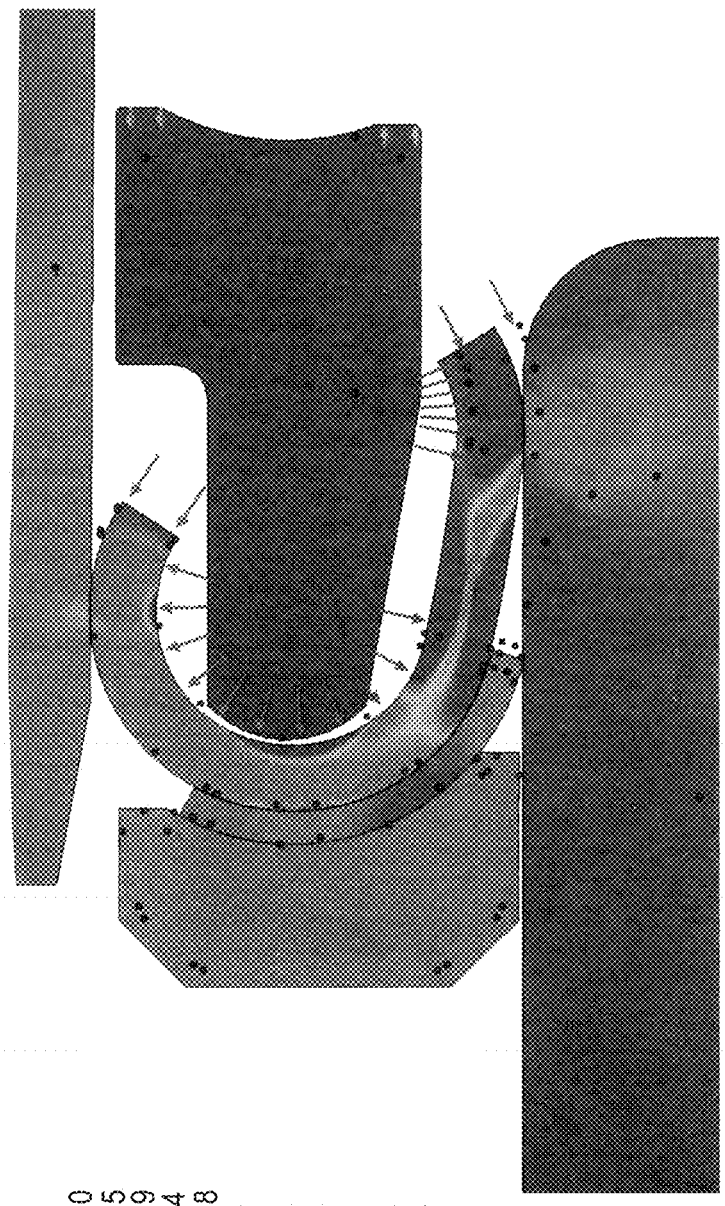
FIG. 3B is a partial cross-sectional view showing the stress distribution on a lipseal of an annular seal stack having at least one support ring according to an embodiment of the disclosure.

FIGS. 3A and 3B are a partial cross-sectional view showing the stress distributions on a lipseal of a traditional annular seal stack and on a lipseal of an annular seal stack 150, 250 having at least one support ring 163, 263, 165, 265 according to an embodiment of the disclosure, respectively. As shown in FIG. 3A, the stress on the arcuate portion of the lipseal in a traditional annular seal stack without a support ring exceeds about 140,000 pounds per square inch (about 965 MPa). Stresses of this magnitude may result in failure of the lipseal. As shown in FIG. 3B, the stress on the arcuate portion of the lipseal in the annular seal stack 150, 250 having at least one support ring 163, 263, 165, 265 is much lower, not exceeding about 76,000 pounds per square inch (about 524 MPa). Accordingly, use of at least one support ring 163, 263, 165, 265 in an annular seal stack 150, 250 may prevent wear, reduce stresses which may prolong the lifespan, and/or altogether prevent failure of a lipseal in an annular metallic seal stack 150, 250.

Embodiments of an assembly 100 and/or a seal stack assembly 150, 250 may include one or more of the following:

Embodiment 1. A seal stack assembly, comprising: a first support retainer; a first lipseal; and a first seal support system comprising at least one support ring disposed between the first support retainer and the first lipseal.

Embodiment 2. An assembly, comprising: a probe; a housing disposed annularly about the probe; and a seal stack assembly disposed within an annulus formed between the probe and the housing and configured to provide a radial seal between the probe and the housing, the seal stack assembly comprising: a first support retainer; a first lipseal; and a first seal support system comprising at least one support ring disposed between the first support retainer and the first lipseal.

Embodiment 3. The seal stack assembly of embodiment 1 or the assembly of embodiment 2, further comprising: a second support retainer configured to support the first lipseal; a second lipseal; a second seal support system comprising at least one support ring disposed between the second support retainer and the second lipseal; and a third support retainer configured to support the second lipseal.

Embodiment 4. A seal stack assembly, comprising: a first support retainer; a first lipseal; a first seal support system comprising at least one support ring disposed between the first support retainer and the first lipseal; a second support retainer configured to support the first lipseal; a second lipseal; a second seal support system comprising at least one support ring disposed between the second support retainer and the second lipseal; and a third support retainer configured to support the second lipseal.

Embodiment 5. An assembly, comprising: a probe; a housing disposed annularly about the probe; and a seal stack assembly disposed within an annulus formed between the probe and the housing and configured to provide a radial seal between the probe and the housing, the seal stack assembly comprising: a first support retainer; a first lipseal; a first seal support system comprising at least one support ring disposed between the first support retainer and the first lipseal; a second support retainer configured to support the first lipseal; a second lipseal; a second seal support system comprising at least one support ring disposed between the second support retainer and the second lipseal; and a third support retainer configured to support the second lipseal.

Embodiment 6. The seal stack assembly or the assembly of any of the preceding embodiments, wherein the first support retainer comprises a cavity having a curved profile configured to receive the at least one support ring of the first support system.

Embodiment 7. The seal stack assembly or the assembly of any of the preceding embodiments, wherein the first lipseal comprises an inner sealing and an outer sealing leg.

Embodiment 8. The seal stack assembly or the assembly of any of the preceding embodiments, wherein the first seal support system comprises a first support ring.

Embodiment 9. The seal stack assembly or the assembly of embodiment 8, wherein an outer radius of the first support ring of the first seal support system is larger than the radius of the curved profile of the cavity of the first support retainer.

Embodiment 10. The seal stack assembly or the assembly of embodiment 9, wherein the outer radius of the first support ring of the first seal support system is at least 1%, at least 2%, at least 3%, at least 4%, at least 5%, at least 10%, at least 15%, or at least 20% larger than the radius of the curved profile of the cavity of the first support retainer.

Embodiment 11. The seal stack assembly or the assembly of embodiment 10, wherein the outer radius of the first support ring of the first seal support system is not greater than 50%, not greater than 40%, not greater than 35%, not greater than 30%, not greater than 25%, not greater than 20%, not greater than 15%, or not greater than 10% larger than the radius of the curved profile of the cavity of the first support retainer.

Embodiment 12. The seal stack assembly or the assembly of any of embodiments 8 to 11, wherein an inner radius of the first support ring of the first seal support system is smaller than an outer radius of an arcuate portion of the first lipseal.

Embodiment 13. The seal stack assembly or the assembly of embodiment 12, wherein the inner radius of the first support ring of the first seal support system is at least 1%, at least 2%, at least 3%, at least 4%, at least 5%, at least 10%, at least 15%, or at least 20% smaller than the outer radius of an arcuate portion of the first lipseal.

Embodiment 14. The seal stack assembly or the assembly of embodiment 12, wherein an inner radius of the first support ring of the first seal support system is not greater than 50%, not greater than 40%, not greater than 35%, not greater than 30%, not greater than 25%, not greater than 20%, not greater than 15%, or not greater than 10% smaller than an outer radius of an arcuate portion of the first lipseal.

Embodiment 15. The seal stack assembly or the assembly of any of the preceding embodiments, wherein the second support retainer comprises an elongated finger portion configured to support the first lipseal and a cavity having a curved profile configured to receive the at least one support ring of the second support system.

Embodiment 16. The seal stack assembly or the assembly of any of embodiments 3 to 15, wherein the second lipseal comprises an inner sealing and an outer sealing leg.

Embodiment 17. The seal stack assembly or the assembly of any of the preceding embodiments, wherein the second seal support system comprises a first support ring.

Embodiment 18. The seal stack assembly or the assembly of embodiment 17, wherein an outer radius of the first support ring of the second seal support system is larger than the radius of the curved profile of the cavity of the second support retainer.

Embodiment 19. The seal stack assembly or the assembly of embodiment 18, wherein the outer radius of the first support ring of the second seal support system is at least 1%, at least 2%, at least 3%, at least 4%, at least 5%, at least 10%, at least 15%, or at least 20% larger than the radius of the curved profile of the cavity of the second support retainer.

Embodiment 20. The seal stack assembly or the assembly of embodiment 19, wherein the outer radius of the first support ring of the second seal support system is not greater than 50%, not greater than 40%, not greater than 35%, not greater than 30%, not greater than 25%, not greater than 20%, not greater than 15%, or not greater than 10% larger than the radius of the curved profile of the cavity of the second support retainer.

Embodiment 21. The seal stack assembly or the assembly of any of embodiments 17 to 20, wherein an inner radius of the first support ring of the second seal support system is smaller than an outer radius of an arcuate portion of the second lipseal.

Embodiment 22. The seal stack assembly or the assembly of embodiment 12, wherein the inner radius of the first support ring of the second seal support system is at least 1%, at least 2%, at least 3%, at least 4%, at least 5%, at least 10%, at least 15%, or at least 20% smaller than the outer radius of an arcuate portion of the second lipseal.

Embodiment 23. The seal stack assembly or the assembly of embodiment 12, wherein an inner radius of the first support ring of the second seal support system is not greater than 50%, not greater than 40%, not greater than 35%, not greater than 30%, not greater than 25%, not greater than 20%, not greater than 15%, or not greater than 10% smaller than an outer radius of an arcuate portion of the second lipseal.

Embodiment 24. The seal stack assembly or the assembly of any of embodiments 3 to 23, wherein the third support retainer comprises an elongated finger portion configured to support the second lipseal.

Embodiment 25. The seal stack assembly or the assembly of any of embodiments 8 to 24, wherein the first seal support system comprises a second support ring disposed between the first support ring of the first seal support system and the first lipseal.

Embodiment 26. The seal stack assembly or the assembly of embodiment 25, wherein an inner radius of the first support ring of the first seal support system is smaller than an outer radius of the second support ring of the first seal support system.

Embodiment 27. The seal stack assembly or the assembly of any of embodiments 25 to 26, wherein the first seal support system comprises a third support ring disposed between the second support ring of the first seal support system and the first lipseal.

Embodiment 28. The seal stack assembly or the assembly of embodiment 27, wherein an inner radius of the second support ring of the first seal support system is smaller than an outer radius of the third support ring of the first seal support system.

Embodiment 29. The seal stack assembly or the assembly of embodiment 28, wherein an inner radius of the third support ring of the first seal support system is smaller than an outer radius of the first lipseal.

Embodiment 30. The seal stack assembly or the assembly of any of embodiments 17 to 29, wherein the second seal support system comprises a second support ring disposed between the first support ring of the second seal support system and the second lipseal.

Embodiment 31. The seal stack assembly or the assembly of embodiment 30, wherein an inner radius of the first support ring of the second seal support system is smaller than an outer radius of the second support ring of the second seal support system.

Embodiment 32. The seal stack assembly or the assembly of any of embodiments 30 to 31, wherein the second seal support system comprises a third support ring disposed between the second support ring of the second seal support system and the second lipseal.

Embodiment 33. The seal stack assembly or the assembly of embodiment 32, wherein an inner radius of the second support ring of the second seal support system is smaller than an outer radius of the third support ring of the second seal support system.

Embodiment 34. The seal stack assembly or the assembly of embodiment 33, wherein an inner radius of the third support ring of the second seal support system is smaller than an outer radius of the second lipseal.

Embodiment 35. The seal stack assembly or the assembly of any of the preceding embodiments, wherein the first lipseal and the second lipseal are substantially similar.

Embodiment 36. The seal stack assembly or the assembly of any of the preceding embodiments, wherein the outer radius of the first lipseal comprises a smaller radius than the inner radius of the first support retainer.

Embodiment 37. The seal stack assembly or the assembly of any of the preceding embodiments, wherein the outer radius of the second lipseal comprises a smaller radius than the inner radius of the second support retainer.

Embodiment 38. The seal stack assembly or the assembly of any of the preceding embodiments, wherein the first lipseal and the second lipseal are formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, or bronze.

Embodiment 39. The seal stack assembly or the assembly of any of the preceding embodiments, wherein the support rings are formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze.

Embodiment 40. The seal stack assembly or the assembly of embodiment 39, wherein the support rings comprise coating or plating, such as a gold plating, a silver plating, a nickel plating, an aluminum chromium nitride (AlCrN) plating, a titanium aluminum nitride (TiAlN) plating, any other wear resistant metallic plating, or any combination thereof Embodiment 41. The seal stack assembly or the assembly of any of the preceding embodiments, wherein the first support ring and the third support ring are formed from a nickel-chromium based alloy such as Inconel®, a nickel-based alloy, nickel, a cobalt-chromium-nickel alloy such as Elgiloy®, titanium, tungsten, stainless steel, spring steel, steel, aluminum, zinc, copper, magnesium, tin, platinum, lead, iron, or bronze, and wherein the second support ring is formed from a polymeric material, such as PEEK.

Embodiment 42. The seal stack assembly or the assembly of any of the preceding embodiments, wherein the support rings comprise a thickness less than a thickness of one or more of the lipseals.

Embodiment 43. A seal stack assembly, comprising: a first support retainer having an asymmetrical shape with an inner diameter having a first axial length and an outer diameter having a second axial length, wherein the first axial length is longer than the second axial length; a first lipseal; and a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal, and a second support retainer supports the first lipseal, wherein the second support retainer comprises an elongated finger portion supporting the first lipseal, wherein the inner diameter of first seal support system is contained within the first axial length.

Embodiment 44. An assembly, comprising: a probe; a housing disposed annularly about the probe; and a seal stack assembly disposed within an annulus formed between the probe and the housing and providing a seal between the probe and the housing, the seal stack assembly comprising: a first support retainer having an asymmetrical shape with an inner diameter having a first axial length and an outer diameter having a second axial length, wherein the first axial length is longer than the second axial length; a first lipseal; and a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal, and a second support retainer supports the first lipseal, wherein the second support retainer comprises an elongated finger portion supporting the first lipseal, wherein the inner diameter of first seal support system is contained within the first axial length.

Embodiment 45. A stack assembly, comprising: a first support retainer having an asymmetrical shape with an inner diameter having a first axial length and an outer diameter having a second axial length, wherein the first axial length is longer than the second axial length; a first lipseal; a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal; a second support retainer supporting the first lipseal; a second lipseal; a second seal support system comprising at least one support ring disposed between the second support retainer and the second lipseal; and a third support retainer supporting the second lipseal, wherein the second support retainer comprises an elongated finger portion supporting the first lipseal, wherein the inner diameter of first seal support system is contained within the first axial length.

This written description uses examples to disclose the embodiments, including the best mode, and also to enable those of ordinary skill in the art to make and use the invention. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal stack assembly, comprising:
a first support retainer having an asymmetrical shape with an inner diameter having a first axial length and an outer diameter having a second axial length, wherein the first axial length is longer than the second axial length;
a first lipseal; and
a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal, and a second support retainer supports the first lipseal, wherein the second support retainer comprises an elongated finger portion supporting the first lipseal, wherein the inner diameter of first seal support system is contained within the first axial length.

2. An assembly, comprising:
a probe;
a housing disposed annularly about the probe; and
a seal stack assembly disposed within an annulus formed between the probe and the housing and providing a seal between the probe and the housing, the seal stack assembly comprising:
a first support retainer having an asymmetrical shape with an inner diameter having a first axial length and an outer diameter having a second axial length, wherein the first axial length is longer than the second axial length;
a first lipseal; and
a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal, and a second support retainer supports the first lipseal, wherein the second support retainer comprises an elongated finger portion supporting the first lipseal, wherein the inner diameter of first seal support system is contained within the first axial length.

3. A seal stack assembly, comprising:
a first support retainer having an asymmetrical shape with an inner diameter having a first axial length and an outer diameter having a second axial length, wherein the first axial length is longer than the second axial length;
a first lipseal;
a first seal support system disposed between the first support retainer and the first lipseal, wherein the first seal support system comprises a first support ring and a second support ring, wherein the first support ring is disposed between the first support retainer and the second support ring, and wherein the second support ring is disposed between the first support ring and the first lipseal;
a second support retainer supporting the first lipseal;
a second lipseal;
a second seal support system comprising at least one support ring disposed between the second support retainer and the second lipseal; and
a third support retainer supporting the second lipseal, wherein the second support retainer comprises an elongated finger portion supporting the first lipseal, wherein the inner diameter of first seal support system is contained within the first axial length.

4. The seal stack assembly of claim 1, wherein the first support retainer comprises a cavity having a curved profile receiving the at least one support ring of the first support system.

5. The seal stack assembly of claim 1, wherein the first lipseal comprises an inner sealing leg and an outer sealing leg.

6. The seal stack assembly of claim 1, wherein an inner radius of the first support ring of the first seal support system is smaller than an outer radius of an arcuate portion of the first lipseal.

7. The seal stack assembly of claim 3, wherein the second support retainer further comprises a cavity having a curved profile receiving the at least one support ring of the second seal support system.

8. The seal stack assembly of claim 3, wherein the second lipseal comprises an inner sealing leg and an outer sealing leg.

9. The seal stack assembly of claim 3, wherein the at least one support ring of the second seal support system comprises a first support ring.

10. The seal stack assembly of claim 9, wherein an inner radius of the first support ring of the second seal support system is smaller than an outer radius of an arcuate portion of the second lipseal.

11. The seal stack assembly of claim 3, wherein the third support retainer comprises an elongated finger portion supporting the second lipseal.

12. The seal stack assembly of claim 1, wherein the first seal support system further comprises a third support ring disposed between the second support ring of the first seal support system and the first lipseal.

13. The seal stack assembly of claim 9, wherein the second seal support system further comprises a second support ring disposed between the first support ring of the second seal support system and the second lipseal.

14. The seal stack assembly of claim 13, wherein the second seal support system further comprises a third support ring disposed between the second support ring of the second seal support system and the second lipseal.

15. The seal stack assembly of claim 1, wherein the outer radius of the first lipseal comprises a smaller radius than the inner radius of the first support retainer.

16. The seal stack assembly of claim 1, wherein the outer radius of the second lipseal comprises a smaller radius than the inner radius of the second support retainer.

17. The seal stack assembly of claim 1, wherein the first support ring comprises a thickness less than a thickness of the first lipseal.

18. The seal stack assembly of claim 1, wherein the first lipseal comprises a substantially J-shaped cross-sectional profile.

* * * * *